No. 780,941. PATENTED JAN. 24, 1905.
C. O. DEUTSCHMANN.
FLUID PRESSURE MOTOR.
APPLICATION FILED JULY 1, 1901.

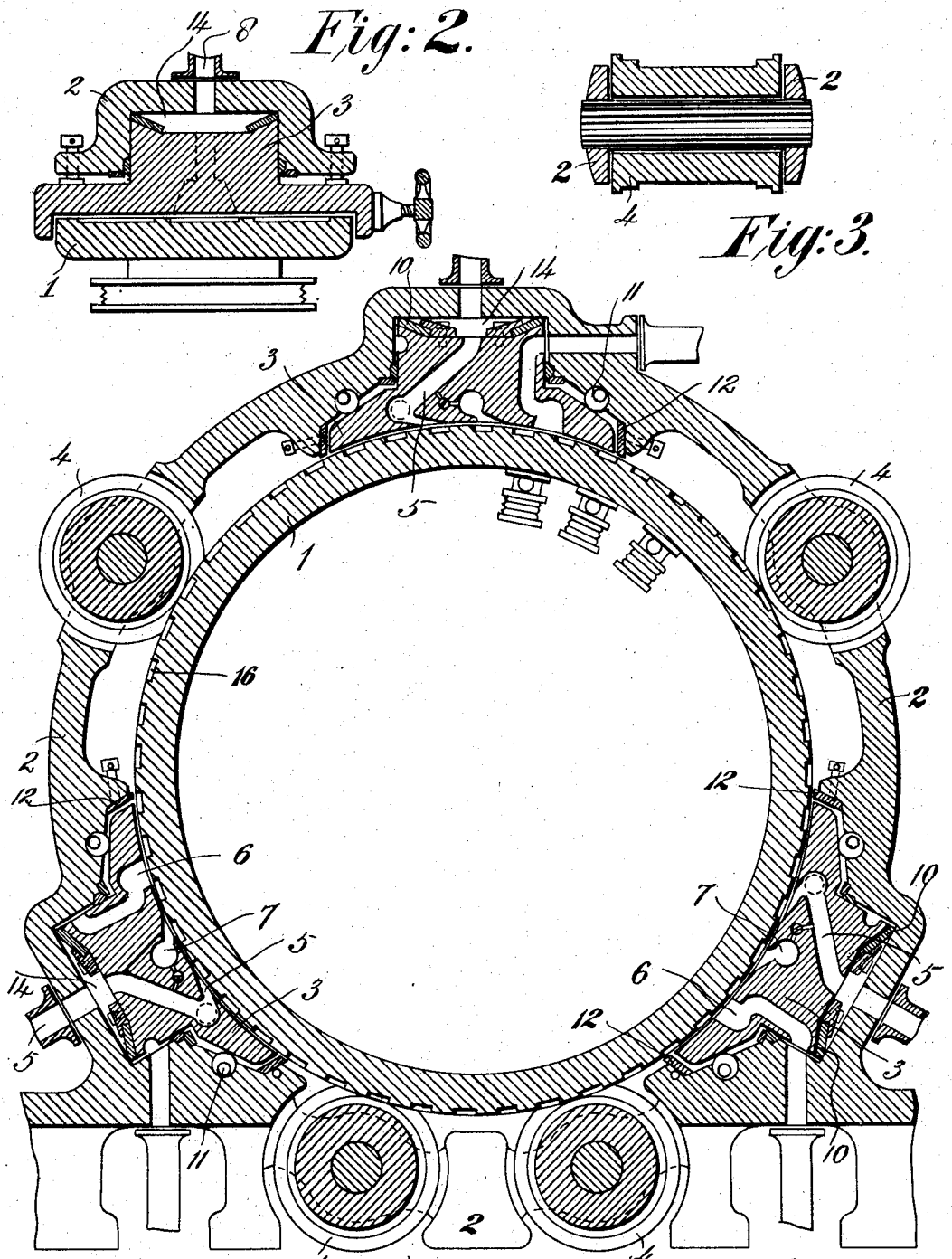

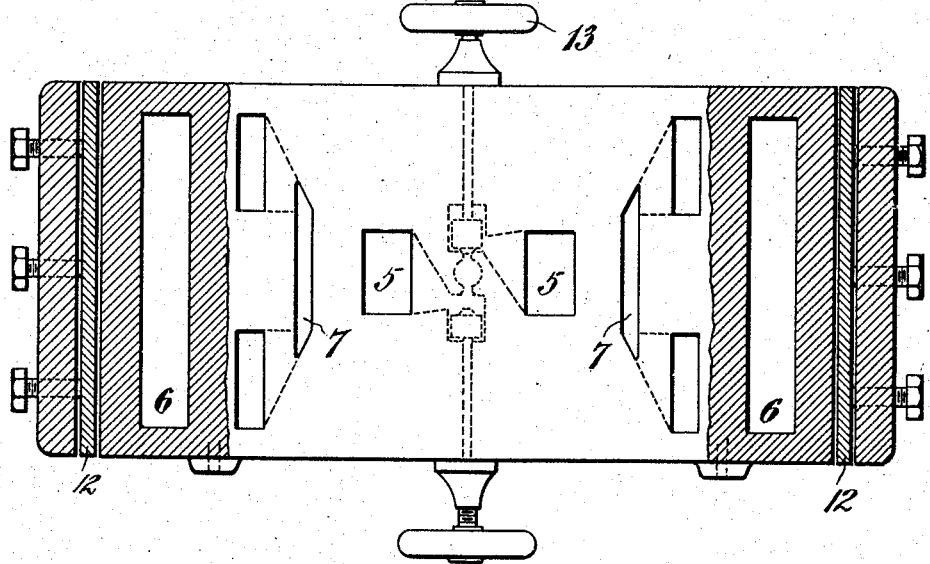
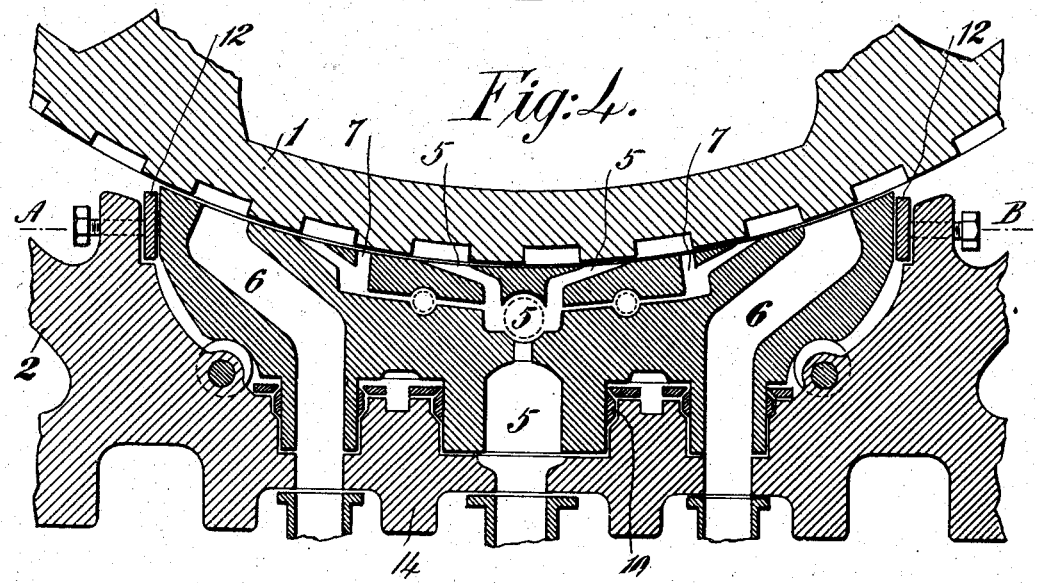

3 SHEETS—SHEET 3.

Witnesses
Edwin D. Bartlett
Albert V. Teale

Inventor
Charles Otto Deutschmann
per Herbert Sefton Jones
Attorney

No. 780,941.

Patented January 24, 1905.

UNITED STATES PATENT OFFICE.

CHARLES OTTO DEUTSCHMANN, OF LONDON, ENGLAND.

FLUID-PRESSURE MOTOR.

SPECIFICATION forming part of Letters Patent No. 780,941, dated January 24, 1905.

Application filed July 1, 1901. Serial No. 66,754.

*To all whom it may concern:*

Be it known that I, CHARLES OTTO DEUTSCHMANN, engineer, a subject of the King of Prussia, Emperor of Germany, residing at 34 South Hill Park, Hampstead Heath, London, England, have invented a new and useful Improvement in Rotary Engines, of which the following is a specification.

My invention applies to motor propulsion of the rotary type, and is capable of a very wide range of adaption for the actuation of locomotives, automobiles, generators of electricity, and power machinery generally. In short, it may be used to practically every purpose for which ordinary steam, gas, compressed-air, explosion, or other fluid-pressure motors have been used.

The essential characteristic of my motor is the construction of one or more valved peripherical pressure-chests and their application under pressure against the revolving surface of a drum, wheel, or ring provided with suitable cavities for the reception of the pressure fluid. Each peripherical power-chest is provided with inlet and outlet channels and other passages and has its base exposed to the pressure of the motor fluid. The respective areas of basal pressure and face pressure of such a peripherical pressure-chest are so proportioned that it will be maintained in operative contact with the moving surface of the motor with the minimum amount of friction necessary to insure sufficient tightness of the contact-surfaces to prevent leakage of the motor fluid.

In order to more fully set forth my invention, I have illustrated it in the accompanying drawings.

Figure 6:
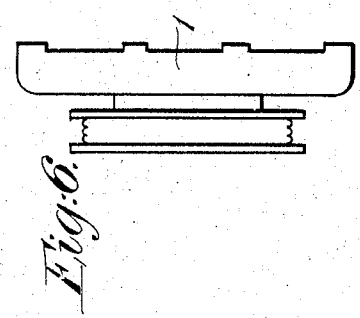
Figure 9:
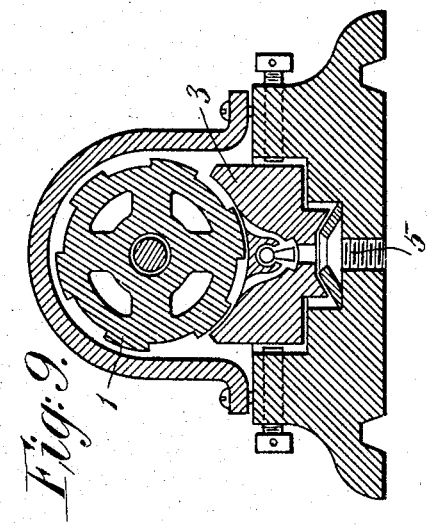
Figure 7:
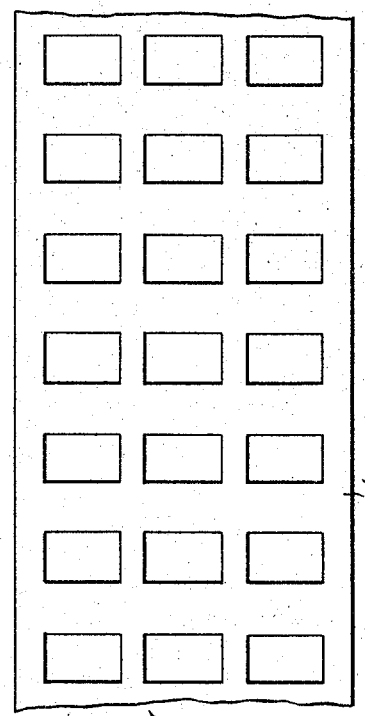
Figure 8:
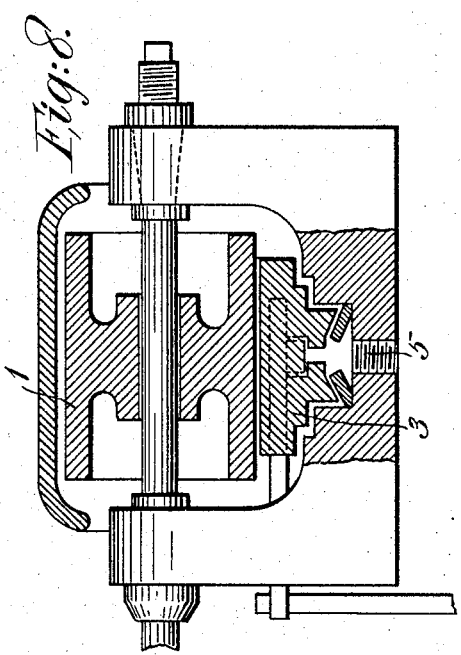

Figure 1 represents a vertical section of a three-phase inductor driven by three valved power-chests with expansion of the motor fluid and with internal channels for the exhaust-steam. Fig. 2 is a section at right angles to Fig. 1 through the middle of one of the power-chests. Fig. 3 is a section of a roller. Fig. 4 is a section of a modified peripherical power-chest in a large stationary engine. Fig. 5 is a horizontal section on the line A B of the power-chest shown in vertical section in Fig. 4. Fig. 6 is a section, and Fig. 7 the extended surface, of the ring of the electric generator, showing three groups of cavities. Fig. 8 shows the head-stock of a lathe with protective covering and power-chest on my system. Fig. 9 is a section of Fig. 8.

The general construction of my invention as applied to a rotary motor is well illustrated by way of example in the section of the three-phase inductor shown in Fig. 1.

The revolving ring 1 is provided with magnets of the usual construction. Three of said magnets only are shown in the drawings. The ring 1 is maintained in its position within the frame-casting 2 by the joint operation of the power-chest 3 and the bearing-rollers 4. These rollers, a section of which is shown in Fig. 3, may be of any convenient construction, but are preferably as shown. They merely serve to keep the ring in position and to support it underneath with a minimum of friction. The outer surface of the ring has cavities, as shown in profile in the section Figs. 2 and 6, and these flutings are divided into series of high and low pressure cavities, in the like manner as is illustrated in Fig. 7 of the drawings. I dispense altogether with the pockets and vanes to be seen on other rotary motors. I dispense entirely with the use of an inlet induction-nozzle. In its place I cause the steam on entering to raise a movable block of substantial dimensions (hereinafter called the "valved movable power-chest") close up against the polished surface of a drum. I thus obtain a perfect steam-tight closure between the concave surface of the block and the drum. This obviates using the pocket-shaped buckets employed formerly to catch the impact of the motive power. I select to cut the cavities or grooves far more shallow in depth and into the solid surface of the wheel, and I leave a substantial wearing-surface between the grooves, as illustrated in Figs. 6 and 7. The middle line of cavities passing in front of the feeding-channels 5 are filled with the motor fluid under pressure and the ring is propelled thereby for some distance. The central cavities filled with pressure on passing further empty some of their pressure into the expansion-chamber. The expansion-chamber propels the ring additionally in filling up the low-pressure cavities situated at the right and left of the central line of cavities, as shown in Fig. 7. The three rows of cavities filled with low-pressure steam travel now in the direction of the exhaust-tubes 6, leading to the condenser. In each power-chest of Fig. 1 the high pressure 5 is separated from exhaust 6 by means of basal packings 10. They pass both through body of power-chest to their corresponding outlets in frame.

The system and arrangement I have constructed for obtaining additional power and propulsion from the expansion of the steam, and thereby an increase of its propelling power in its first stage, consists of the expansion-chamber 7 within each of the movable power-chests. This chamber actuates with diminished pressure upon additional cavities from the inside of each movable chest. It also has a valved by-pass for high pressure from the main channel 5. Several of such expansion-chambers may be used in one power-block for the higher grades of pressure.

The steam or other pressure fluid enters at the base of each steam-chest through the main supply-tube into the space 14. This space is advantageously made as restricted as possible in capacity in order to economize the power; but the basal pressure on the power-chest 3 should be sufficient to counteract the repulsive action of the steam pressing against the rotating face of the motor. In order to prevent the power-chest falling away from the face of the motor on any momentary diminution of pressure, some bolts are provided at the sides (to be seen in Fig. 2) and small excenters 11 at the tapering ends of the power-chest as supports for the same. They cause the possible movement of the power-chest to be limited to a very small distance. The set-screws, ledges, and adjustable blocks 12 are provided for the purpose of adjusting the power-chest centrally at its outer ends.

The power-chests are not in contact with the ring during the motor running empty; but upon turning on the main valve they are pressed upon it and held in position during all the fluctuations of pressure in the motive power. The regulation of speed is attained by the valve of the main supply. The valve in each single power-chest (best seen in Fig. 2) regulates to some extent the proportions of pressure in front of power-chest to the pressure at the base. The closing of these valves below their normal measure of passage transforms these power-chests immediately into brake-blocks under pressure. This constitutes a convenient, quick, and reliable brake in the motors of smaller size. With a judicious handling of this central valve inside the power-chest the pressure between drum and chest may be increased close up to the point of blowing off. To ascertain this condition, an additional channel may be cut in the side ledge of the power-chest. With these close-balanced proportions of pressure the ring or drum is held and supported, virtually floating within three strata or linings of compressed air or steam. The chests release contact with the ring to the extent of the escaping strata of steam. Close within this described degree are the proper conditions of working the motor most economical and safe.

A steam-tight jacket or covering over the entire motor is not applied with this type of motors, because the wear and tear on the operating-surfaces is automatically compensated owing to the power-chests being movable. They immediately close up against the drum on the pressure entering. A covering not steam and air tight to protect the polished surface of the drum is shown in Figs. 8 and 9.

In Figs. 4 and 5 I have illustrated a modified form of motor adapted to be reversible and to work with greater efficiency. In this larger type of motor the steam-inlet 5 is central in the peripherical power-chest and the escape is through one or other of the passages 6, according to the setting of the valves 13, whereby the direction of rotation of the motor is determined. Here multiple expansion is applied and the steam undergoes successive expansions in passing the cavities provided for the purpose until it reaches the outlet. The expansion-chambers have direct passages to the main valve to take high pressure occasionally and on emergency. These expansion-chambers, with their passages, which I employ in both types of power-chests shown in Fig. 1 and in Figs. 4 and 5, are distributive chambers to guide and direct the expanding fluid from the middle line of cavities of the ring or wheel (best seen in Fig. 7) to the two outer lines of cavities, which are out of reach for the high-pressure port of the power-chest.

The ring of Fig. 1 and the wheel of Fig. 4 have both the same grouping of the cavities for high and low pressure as illustrated in Fig. 7. The middle line of cavities of such a ring or wheel is always fed from the high-pressure port of the power-chest. This port must be steam-tight toward the low-pressure cavities, which pass it on both sides, right and left, without being filled. They are filled from the expansion-chamber port, and thereby receive propulsion from the expanding steam which the expansion-chamber collects from the middle line of cavities. All the three lines of cavities have now a lower and equalized degree of pressure and they pass into the vacuum-chamber.

In starting such a large motor the high pressure filling up the middle line of cavities largely condenses in the expansion-chamber and the low-pressure cavities would receive no propulsion. I therefore provide these expansion-chambers with direct communications, having valves, to lead high pressure direct into the expansion-chamber to act upon the ring with high pressure all over for starting the motor. These valves for the by-pass communications must be closed as soon as the motor reaches the normal speed. They may be opened to a small extent with heavy loads and on emergency.

Figs. 8 and 9 are drawings showing the application of my invention to the head-stock of a lathe and showing a protective covering for the drum. The valved power-chest acts on the same method of propulsion as has been described with the larger types of motors. I have illustrated these applications by way of example only because my invention is capable of an almost indefinite number of adaptations to machinery of nearly all kinds; but the underlying principle governing all of these is one and the same—namely, it is the formation and construction of a valved movable pressure-chest held under pressure against a drum, wheel, or ring provided with suitable cavities compensating the wear and tear of the contact-faces of drum and chest automatically. The outer shape and extent of the power-chests may be a rectangular block or a plate with little or no press-plunger on its base, similar to Figs. 8 and 9; but the specified channelings, their valves inside, and their being movable to and fro upon the operating-surface constitute them as the vital part described in my invention. I do not illustrate the movable power-chests operating upon the plane faces of a wheel, because their operating-surfaces would wear away unevenly and they would leak toward the circumference. I retain full liberty to cut any additional channels inside the power-chests and retain full scope in altering their outside appearance.

Although in the drawings I have illustrated the rotary apparatus as operated by three power-chests, it is obvious that I may use more or less than this number, as circumstances may require.

I use no packings or packing-strips in whatever form or condition upon the contact-faces of the power-chests.

What I claim as my invention is—

1. In a rotary motor-engine a valved peripherical power-chest adapted to be forced against the rotary member and held in operative contact therewith by the pressure of the motor fluid against its base; valved channels and expansion-chambers in said power-chest adapted to convey the motor fluid to the face of the rotary member; auxiliary supports for the ends of the power-chests; and ledges with adjustment-bolts, substantially as set forth.

2. In a rotary motor-engine in combination a plurality of power-chests, channels and valves in said chests, stuffing-boxes adapted to support the said chests movable and steam-tight in self-adjusting operative contact with the rotary member by means of the pressure of the motor fluid and mechanical means for controlling the motion of the said power-chests, substantially as set forth.

3. In a rotary motor-engine, a valved movable power-chest, an open frame supporting said chest, an exhaust-channel opening out through said frame and passing from the front stuffing-box to the back packing of the power-chest, substantially as set forth.

4. In a rotary motor-engine the combination of a plurality of valved movable power-chests, internal channels in said chests, expansion-chambers in said chests connected to the said channels, a valved by-pass connected to each said expansion-chamber, a regulating-valve for high pressure and outlet channel with a cylindrical rotary member provided with cavities for high and low pressure, substantially as set forth.

5. In a rotary motor-engine the combination of a valved movable power-chest, a double system of channelings, valves and expansion-chambers for reversing motion of fluid-pressure in the interior of said power-chest, a valved by-pass for the expansion-chamber, two outlets for exhaust-steam in separate stuffing-boxes, and mechanical means for support and adjustment of motion of power-chests substantially as set forth.

6. In a rotary motor-engine a valved peripherical pressure-chest, an oscillating reversing-valve in the interior of said pressure-chest, a rotary member, and means for mechanically adjusting and controlling the pressure of said chest against said rotary member, substantially as set forth.

In testimony whereof I have signed my name to this specification in the presence of two subscribing witnesses.

CHARLES OTTO DEUTSCHMANN.

Witnesses:
HERBERT SEFTON JONES,
LEONARD E. HAYNES.